(12) United States Patent
Horvitz et al.

(10) Patent No.: US 6,490,698 B1
(45) Date of Patent: Dec. 3, 2002

(54) MULTI-LEVEL DECISION-ANALYTIC APPROACH TO FAILURE AND REPAIR IN HUMAN-COMPUTER INTERACTIONS

(75) Inventors: Eric Horvitz, Kirkland, WA (US); Timothy Paek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/326,043

(22) Filed: Jun. 4, 1999

(51) Int. Cl.[7] .................................................. G06F 11/00
(52) U.S. Cl. ......................... 714/46; 704/251; 704/257
(58) Field of Search ........................... 714/46; 345/809; 704/200, 200.1, 246, 251, 257

(56) References Cited

U.S. PATENT DOCUMENTS

| | | | |
|---|---|---|---|
| 5,255,386 A | * 10/1993 | Prager | 707/5 |
| 5,748,841 A | 5/1998 | Morin et al. | |
| 5,864,848 A | 1/1999 | Horvitz et al. | 707/6 |
| 6,311,159 B1 | * 10/2001 | Van Tichelen et al. | 704/251 |

OTHER PUBLICATIONS

Araki M, Doshita S, Cooperative Spoken Language Model Using Bayesian Network and Event Hierarchy, IEICE Transaction on Information and Systems, vol. E78–D No. 6, June 1995, pp. 629–635, XP002148396, Japan.

Inspec Database, Institute of Electrical Engineers, Stevenage, GB, Inui K et al, A framework of decision–theoretic utterance planning, database accession No. 5757396, XP002148397, abstract, Journal of Japanese Society for Artificial Intelligence, Sep. 1997, Japanese Soc Artificial Intelligence, Japan, ISSN 0912–8085, vol. 12, pp. 760–769, 1997.

U.S. patent application Ser. No. 09/055,477, Platt, filed Apr. 6, 1998.

Eric Horvitz, David Heckerman, et al., Heuristic Abstraction in the Decision–Theoretic Pathfinder System, Proceedings of the Thirteenth Symposium on Computer Applications in Medical Care, IEEE Computer Society Press, 1989.

David Heckerman, Eric Horvitz, Inferring Informational Goals from Free–Text Queries: A Bayesian Approach, Fourteenth Conference on Uncertainty in Artificial Intelligence, 1998.

Stephen D. Richardson, William B. Dolan, Lucy Vanderwende, MindNet: acquiring and structure semantic information from text, MSR–TR–98–23, Proceedings of the 17th International Conference on Computational Linguistics, May 29, 1998.

Stephen D. Richardson, Bootstrapping Statistical Processing into a Rule–based Natural Language Parser, MSR–TR–95–48, Proceedings of Workshop, The Balancing Act: Combining Symbolic and Statistical Approaches to Language, Jul. 1994.

Stephen D. Richardson, Lucy Vanderwende, William Dolan, Combining Dictionary–Based and Example–Based Methods for Natural Language Analysis, MSR–TR–93–08, Jun. 1993.

(List continued on next page.)

Primary Examiner—Scott Baderman
(74) Attorney, Agent, or Firm—Amin & Turocy, LLP (57) ABSTRACT

A multi-level decision-analytic approach to failure and repair within computer-user communications is disclosed. In one embodiment, a computerized system for repairing communication failure within a computer-user interaction context includes a maintenance module, an intention module, and a conversation control subsystem. The maintenance module manages uncertainty regarding signal identification and channel fidelity. The intention module is supported by the maintenance module, and manages uncertainty about the recognition of user's goals from signals. The conversation control subsystem surrounds both the modules, and manages the joint activity between the computer and the user, and one or more high-level events regarding the joint activity.

51 Claims, 6 Drawing Sheets-

OTHER PUBLICATIONS

Goodwin, Between and within: Alternative sequential treatments of continuers and assessments, Human Studies, 1986(9), pp. 205–217.

Grice, Meaning, Philosophical Review, 1957 (66), pp. 377–388.

Grice, Logic and conversation, Syntax and Semantics 3: Speech Acts, 1975, pp. 41–58.

Jefferson, Side sequences, Studies in Social Interaction, 1972, pp. 294–338.

Schegloff and Sacks, Opening up closings, Semiotica, 1973, pp. 289–327.

Clark, Making sense of nonce sense, The Process of Language Understanding, 1983, pp. 297–331.

Cohen and Levesque, Preliminaries to a collaborative model of dialogue, Speech Communication, 1994 (15), pp. 265–274.

Clark and Wilkes–Gibbs, Referring as a Collaborative Process, chapter 23 of Intentions in Communication, 1990.

Platt, East Training of Support Vector Machines Using Sequential Minimal Optimization, chapter 12 of Advances in Kernel Methods: Support Vector Learning, 1999.

Clark and Brennan, Grounding in Communication, chapter 7 of Perspectives on Socially Shared Cognition, 1991.

Herbert H. Clark, Using Language, 1996, chapters 5 (Meaning and Understanding), 1 (Language Use) and 13 (Conclusion), and pp. 222–226.

* cited by examiner-

MULTI-LEVEL DECISION-ANALYTIC APPROACH TO FAILURE AND REPAIR IN HUMAN-COMPUTER INTERACTIONS

RELATED APPLICATIONS

This case is related to the cofiled, copending and coassigned case entitled "Computer-Based Representations and Reasoning Methods for Engaging Users in Goal-Oriented Conversations" U.S. application Ser. No. 09/326,254, which is now U.S. Pat. No. 6,421,655, which is hereby incorporated by reference.

FIELD OF THE INVENTION

This invention relates generally to computer-user interaction, and more particularly to a multi-level decision-analytic approach to failure and repair in such interaction.

BACKGROUND OF THE INVENTION

Generally, computer-user interaction has focused on the user conforming more to idiosyncrasies of the computer than vice-versa. For example, while users in noncomputer interactions (such as human-human interactions) typically communicate with a combination of verbal and nonverbal signals, this is generally not done with computer-user interactions. Rather, the user is forced to input information into a computer in a manner more easily understood by the computer—such as constrained voice inputs, text input from a keyboard, pointing, movement and clicking input from a mouse, etc. As a result, this imposed unnaturalness of the computer-user interface has played a part in hampering efforts to make computers easier to use and more an intuitive part of everyday life.

In human-human dialog, speakers and listeners elegantly coordinate the presentation and acceptance of utterances to achieve and confirm mutual understanding. In the process, they make decisions under uncertainty that minimize the risk of misunderstanding and contribute to furthering the goals of the activity. Uncertainty usually always plays a part in dialog. For example, a listener may be uncertain about the articulation of an utterance. Likewise, a speaker may be uncertain about the attentiveness or comprehension of the listener. Although participants may tolerate a small degree of uncertainty, an excessive amount in a given context can lead to misunderstanding along with all of its associated costs, such as the unwanted premature termination of a joint activity.

In human-computer dialog, the success of spoken interaction systems that integrate component technologies such as speech recognition, text to speech, and natural language generation, relies upon the precision of the component technologies. However, while uncertainty and imprecision characterize human-human dialog, people manage quite well in most situations. They display not only the ability to reason about key uncertainties and their costs, but they also exploit strategies such as grounding for collaboratively resolving them. Conversely, prior-art approaches to managing uncertainty within human-computer dialog usually perform much less well.

Prior art approaches to resolving uncertainty within computer-human dialog, such as uncertainty about the attentiveness and comprehension of the listener, are typically ad hoc. The prior art approaches generally do not reason about the sources of the uncertainty and how to resolve them. For example, they generally do not distinguish between communication failures due to poor fidelity of the communication channel or the user simply not being attentive at the time of the utterance execution. This makes for less robust and less flexible systems when uncertainty is encountered, and leads to a less natural contextual experience for the user.

For these and other reasons, there is a need for the present invention.

SUMMARY OF THE INVENTION

The invention relates to a multi-level decision-analytic approach to failure and repair within computer-user communications. In one embodiment, a computerized system repairs communication failure within a computer-user interaction context, and includes a maintenance module, an intention module, and a conversation control subsystem. The maintenance module manages uncertainty regarding signal identification and channel fidelity. The intention module is supported by the maintenance module, and manages uncertainty about the recognition of user's goals from signals. The conversation control subsystem surrounds both the modules, and manages the joint activity between the computer and the user, as well as one or more high-level events regarding the joint activity.

Thus, in one embodiment of the invention, each of the modules and the control subsystem manage uncertainty at different levels. The maintenance module manages uncertainty at the channel level and the signal level. The intention module manages uncertainty at the intention level. The conversational control subsystem manages uncertainty at the conversation level.

In this manner, embodiments of the invention provide for advantages over the prior art. By discerning where the uncertainty lies within a computer-user dialog, the inventive system is able to more naturally recover from any failure that may result from the uncertainty. For example, the manner by which repair is accomplished when uncertainty lies at the channel level—e.g., there is a failure between the basic link between the computer and the user—is different than when uncertainty lies at the intention level—e.g., the user is not understanding the computer's intentions, or viceversa. The end result is that the computer-user interaction experience is more natural for the user involved.

Embodiments of the invention include computer-implemented methods, computer-readable media, and computerized systems of varying embodiments. Still other embodiments, advantages and aspects of the invention will become apparent by reading the following detailed description, and by reference to the drawings.

DETAILED DESCRIPTION OF THE INVENTION

In the following detailed description of exemplary embodiments of the invention, reference is made to the accompanying drawings which form a part hereof, and which shows by way of illustration specific exemplary embodiments the invention may be practiced. These embodiments are described in sufficient detail to enable those skilled in the art to practice the invention, though it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
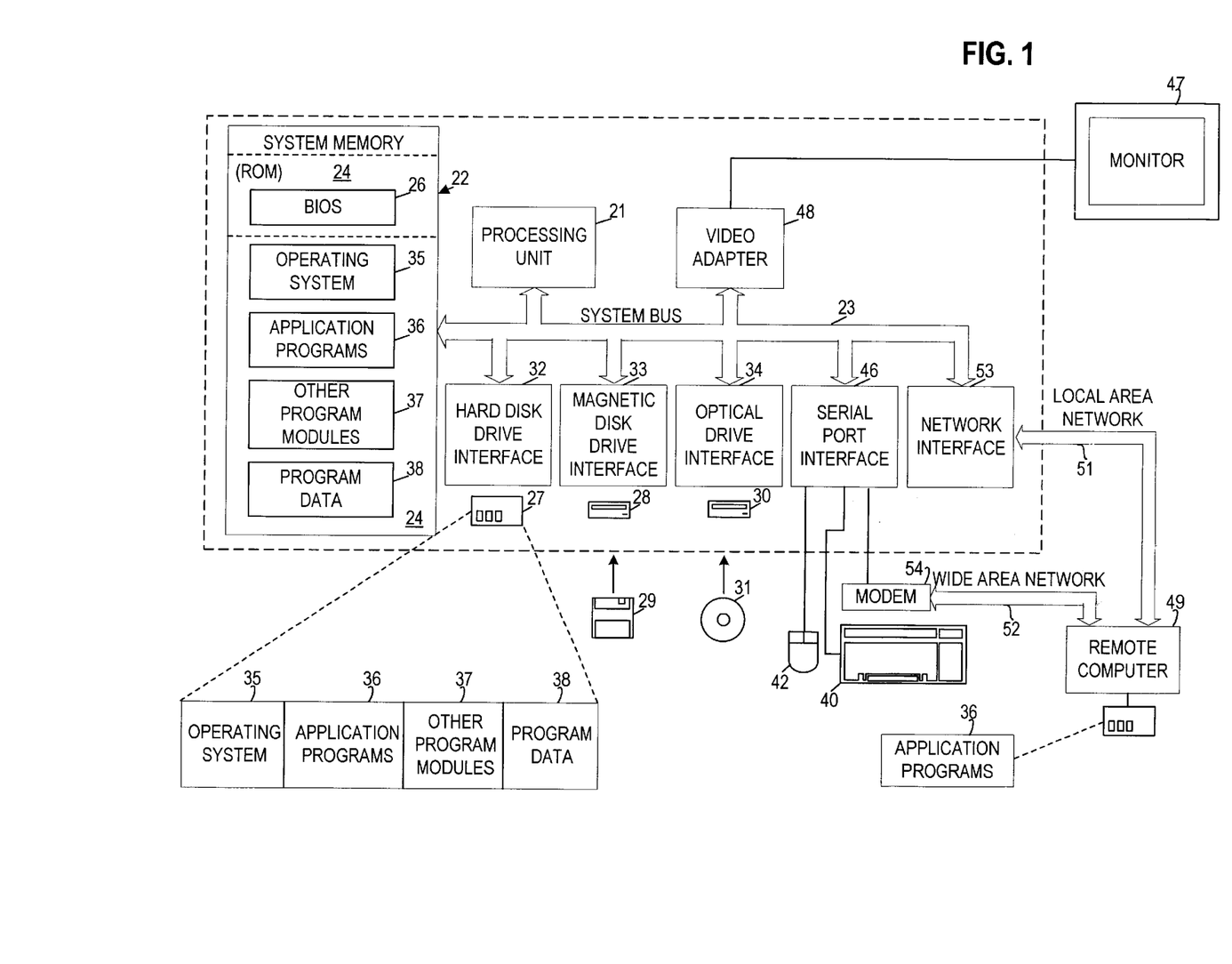
FIG. 1 is a diagram of an operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Four Levels of Representation and Analysis

Figure 2:
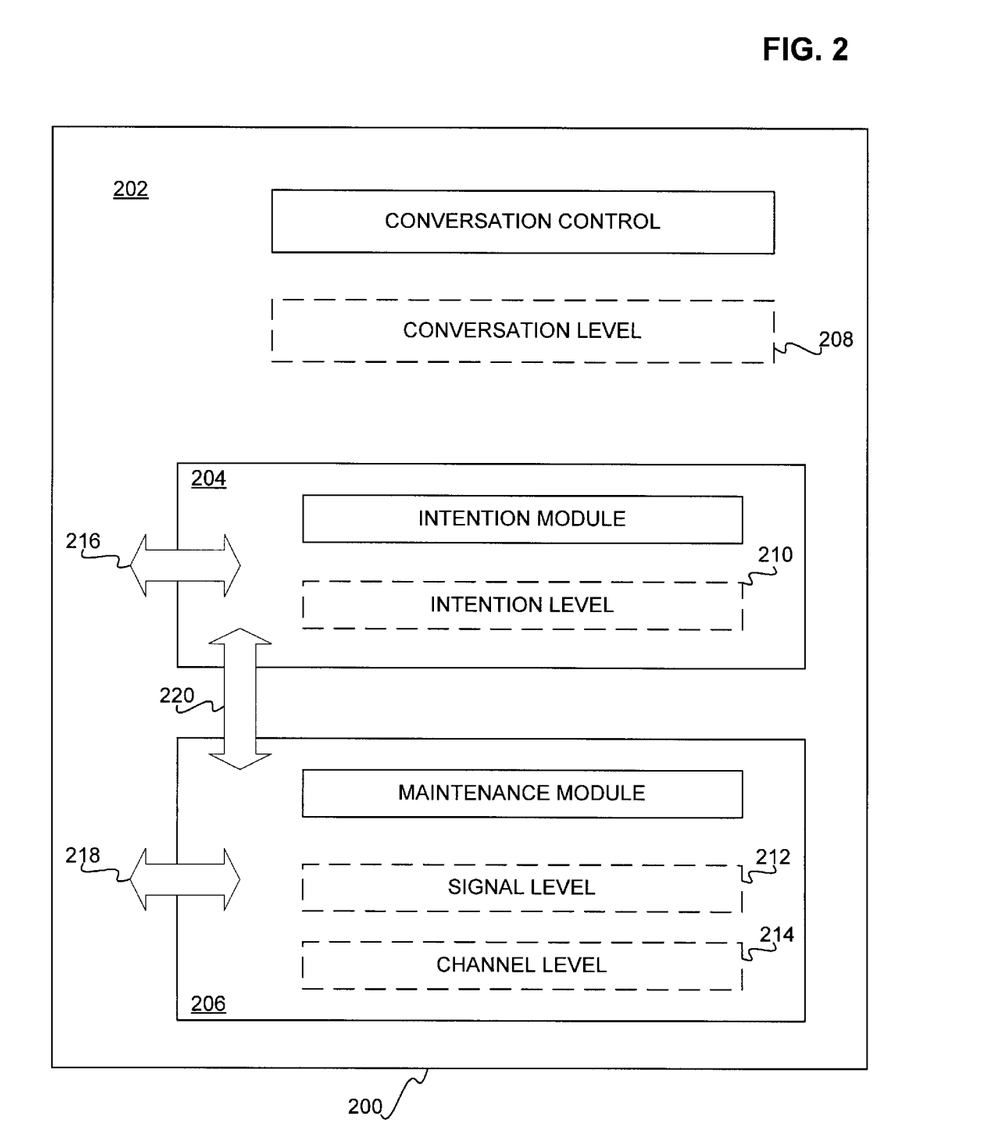
FIG. 2 is a diagram of a system according to an embodiment of the invention.

In this section of the detailed description, four levels of representation of analysis for repairing failure in computer-user dialog (i.e., managing uncertainty in such dialog), according to one embodiment of the invention, are described. The levels are described in conjunction with a system according to an embodiment of the invention, a diagram of which is shown in FIG. 2. Therefore, in describing the four levels, reference is made to the diagram of the system of FIG. 2.

It is noted that an important aspect of dialog is the ongoing reasoning and decision making about the nature of the information or goals being communicated. Information gathering and decision making under uncertainty play central roles in conversation. The management of uncertainty appears to be important in the formulation of discriminating questions that promise to be useful for disambiguating key uncertainties, and for guiding dialog to appropriate levels of detail at which to exchange information or to ask questions.

The system and four levels thereof that are described are useful in at least some embodiments of the invention for a computer's management of uncertainty in a conversation with a user, in particular (but not limited to) in the context of a joint activity. A joint activity is a term used by psycholinguists to describe behavior that is a task-oriented, social event with constraints on the participants, setting, and most of all, on the kinds of allowable contributions that are considered reasonable by each participant. Participants in a joint activity assume that they share a common set of beliefs about the activity, including assumed roles and responsibilities as to the other participants. For example, the receptionist domain, where a receptionist assists others with tasks that the others expect the receptionist to assist them with, is one such joint activity. That is, people assume that the primary task of the receptionist is to assist them achieve their activity-defined goals in a prompt, collaborative fashion.

Speakers and listeners ground mutual understanding at four levels. As shown in FIG. 2, these levels include the channel level 214, the signal level 212, the intention level 210, and the conversation level 208. The channel level 214 is the most basic level. In this level, a speaker attempts to open a channel of communication by executing a behavior, such as an utterance or an action, for the listener. However, the speaker cannot get the listener to perceive the behavior without coordination: the listener must be attending to and perceiving the behavior precisely as the speaker is executing it.

At the next higher level, the signal level 212, the speaker presents a behavior as a signal to the listener. Not all behaviors are meant to be signals—for instance, scratching an itch. Therefore, the speaker and listener must coordinate what the speaker presents with what the listener identifies.

The intention level 210 is where interlocutors construe the propositional content of signals. Prior art dialog systems generally focus almost entirely on this level. In addition, the copending, cofiled and coassigned application entitled "Computer-User Interaction via Task Abstraction Hierarchy", which has been incorporated by reference, presents a novel such dialog system that can be utilized with embodiments of the invention, although the invention is not so limited. In the intention level 210, the speaker signals some proposition for the listener. What the listener recognizes to be the goal of the speaker in signaling a signal is how the listener arrives at the goal. It is noted that the signal is different from the goal of the speaker in using the signal—e.g., indirect speech acts, as known within the art. By focusing on the goals of the speaker, the intention level treats the speaker's meaning as primary. The speaker cannot convey the goal through the signals without the listener recognizing that the speakers intends to use the signal. This again takes coordination.

Finally, at the conversation level 208, the speaker proposes a joint activity which the listener considers and takes up. A proposal solicits an expected response. For example, in an indirect speech act such as "I have to go to the North Campus" meaning "Please call a shuttle to the North Campus," the speaker is proposing an activity for the speaker and the listener to carry out jointly—that the speaker gets the listener to call a shuttle. The speaker cannot get the listener to engage in the activity without the coordinated participation of the listener in calling a shuttle.

The four levels of analysis form a ladder of co-temporal actions known in the art as upward completion. Actions at a given level of dialog are completed bottom up. Thus, the speaker must get the listener to attend to the behavior at the channel level 214 in order to get the listener to identify the presentation of the signal at the signal level 212 in order to get the listener to understand what the speaker means at the intention level 210 in order to finally get the listener to consider the proposal of the activity at the conversation level 208.

Evidence that one level is complete is also evidence that all levels below that are complete. Evidence flows downward. Thus, when the listener takes up an action, it provides evidence to the speaker that the listener recognized the goal behind the signal which then provides evidence that the signal was identified and that the channel was open.

Actions at all four levels are usually taken under uncertainty. For example, at the lowest level 214, interlocutors may be uncertain about channel fidelity; hence, they may search for physical signs of attentiveness such as eye gaze or head nodding. Listeners then display evidence of understanding through back channels such as "uh huh," as known within the art.

With uncertainty comes cost. For example, if listeners are uncertain about channel fidelity, the cost of asking for a repeat may be slight compared to the cost of continuing along with grounding what was said. With confirmations such as "Did you get that?", the benefits of improving the likelihood of mutual understanding may outweigh the cost of asking, considering the larger cost involved in the potential need to retrace later.

System

In this section of the detailed description, a system according to an embodiment of the invention is described. In addition, Bayesian networks, decision-based transition networks, inference probabilities, and probability thresholds are described. The description is made with reference to FIGS. 2, 3, 4(a) and 4(b).

Bayesian reasoning and expected value decision making is used in an embodiment of the invention to identify ideal actions in dialog, taking into consideration uncertainties about communication fidelity and meaning, and the potentially varying costs and benefits of alternate actions taken under these uncertainties. The likelihood of states of interest that cannot be observed directly with Bayesian networks are computed in this embodiment.

Referring again to FIG. 2, a diagram of a system according to one embodiment of the invention is shown. The system 200 includes an intention module 204, a maintenance module 206, and a conversation control subsystem 202. Each of the module 204, module 206 and subsystem 202 can in one embodiment be implemented as a computer program executed by a processor from a computer-readable medium such as a memory, from a computer such as the one of FIG. 1. However, the invention is not so limited.

The maintenance module 206 manages uncertainty about signal identification and channel fidelity. Consistent with the notion of upward completion, the maintenance module 206 supports the intention module 204, which manages uncertainty about the recognition of user goals from signals. Surrounding both modules is the conversation control subsystem 202, which manages uncertainty about the status of the joint activity, what is known in the art as Gricean maxims, common ground (i.e., a shared knowledge base for dialog), and other higher-level dialog events relevant to the joint activity (e.g., the number of questions asked thus far by the system, etc.).

The arrows 216, 218 and 220 indicate the flow of information among the modules 204 and 206 and the subsystem 202. The conversation control subsystem continually exchanges information with both modules 204 and 206, as represented by the arrows 216 and 218, respectively, and determines where to focus on grounding mutual understanding. The conversation control subsystem 202 also adjusts costs or utility based on records it keeps of conversation-level observations, such as the number of questions asked so far by the system. The arrow 220 represents the upward completion of actions; thus, when there is evidence that the intention level 210 is complete, the intention module 204 passes this evidence down to the signal level 212 and the channel level 214, so that the maintenance module 206 understands that the signal was identified and that the channel was open.

Figure 3:
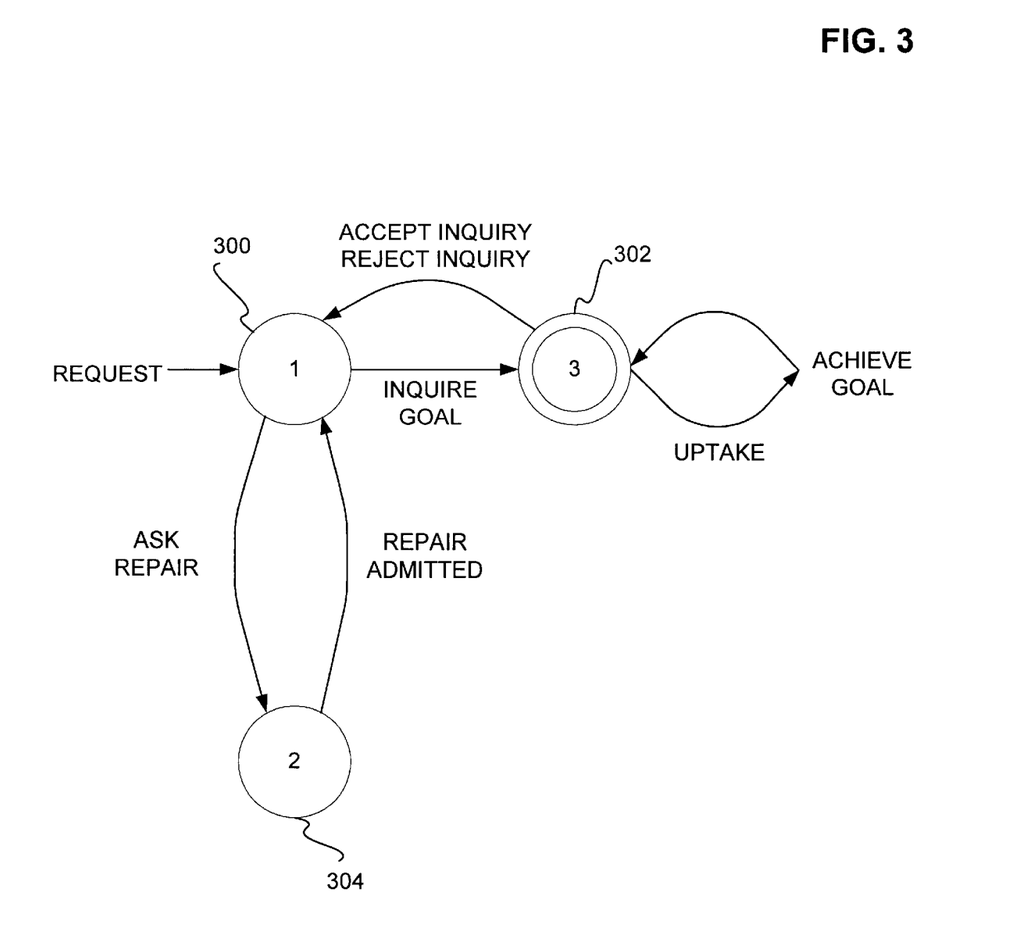
FIG. 3 is a diagram of a decision-based transition network (DTN) according to an embodiment of the invention.

Bayesian networks are used in one embodiment to obtain probabilities for decision making. The Bayesian networks allow the system 200 to model dependencies between uncertainties, making it possible to reason about sources of misunderstanding in a structured manner. In one embodiment, each of module 204 and module 206 include at least one decision-based transition network (DTN), which is a finite automaton with transitional inputs set by decision-theoretic functions, as known in the art. A DTN according to one embodiment of the invention, therefore, utilizes Bayesian inference and expected value computation to determine what transitions to follow to maximize mutual understanding and minimize collaborative effort. A diagram of a representative example of such a DTN, according to one embodiment, as can be used in the context of the intention level 210 of FIG. 2, is shown in FIG. 3, as is specifically described starting in the next paragraph. The network structure of a DTN encodes conversational strategies for resolving uncertainty.

Grounding in dialog is carried out in what is known in the art as adjacency pairs: an ordered pair of utterances where the second pair part depends on the first by being conditionally relevant—that is, relevant and expectable. A prototype is a question and answer. Adjacency pairs are sketched into the structure of a DTN. Thus, referring to FIG. 3, a DTN is shown for handling request in the intention module. The conditionally relevant response to a request is the uptake state 3 (represented as node 302). However, if there is uncertainty about the request state 1 (as represented as node 300), then it can be cost efficient to initiate what is known in the art as an embedded side sequence, as represented by the node 304. The side sequence may be a question to repair any misunderstanding. In one embodiment, uncertainty in a DTN is assessed with Bayesian networks.

As shown in FIG. 3, the primary uncertainty in the intention level is the goal of the user, although the uncertainty is not so limited. This cannot be observed directly, however, so the system in one embodiment uses a Bayesian network to come up with a distribution over possible goals given all the linguistic and nonlinguistic evidence is has observed thus far. As described in the copending, coassigned and cofiled application entitled "Computer-Based Representations and Reasoning Methods for Engaging Users in a Goal-Oriented Conversation" U.S. application Ser. No. 09/326,254, which is now U.S. Pat. No. 6,421,655, which has already been incorporated by reference, hierarchically decomposing the goals into several Bayesian networks can refine inference for navigating dialog. The probability of the most likely goal given the evidence can be written p(Goal|E). If this probability does not exceed a certain threshold for uptaking the request, the system has to decide between two types of conversational strategies, encoded in the DTN as transitional inputs, as is shown in FIG. 3:

1. Inquire Goal, which explicitly asks the user to confirm the most likely guess of the goal, computed as argg max p(Goal|E); or,
2. Ask Repair, which uses a side sequence to gather more information.

Figure 4A:
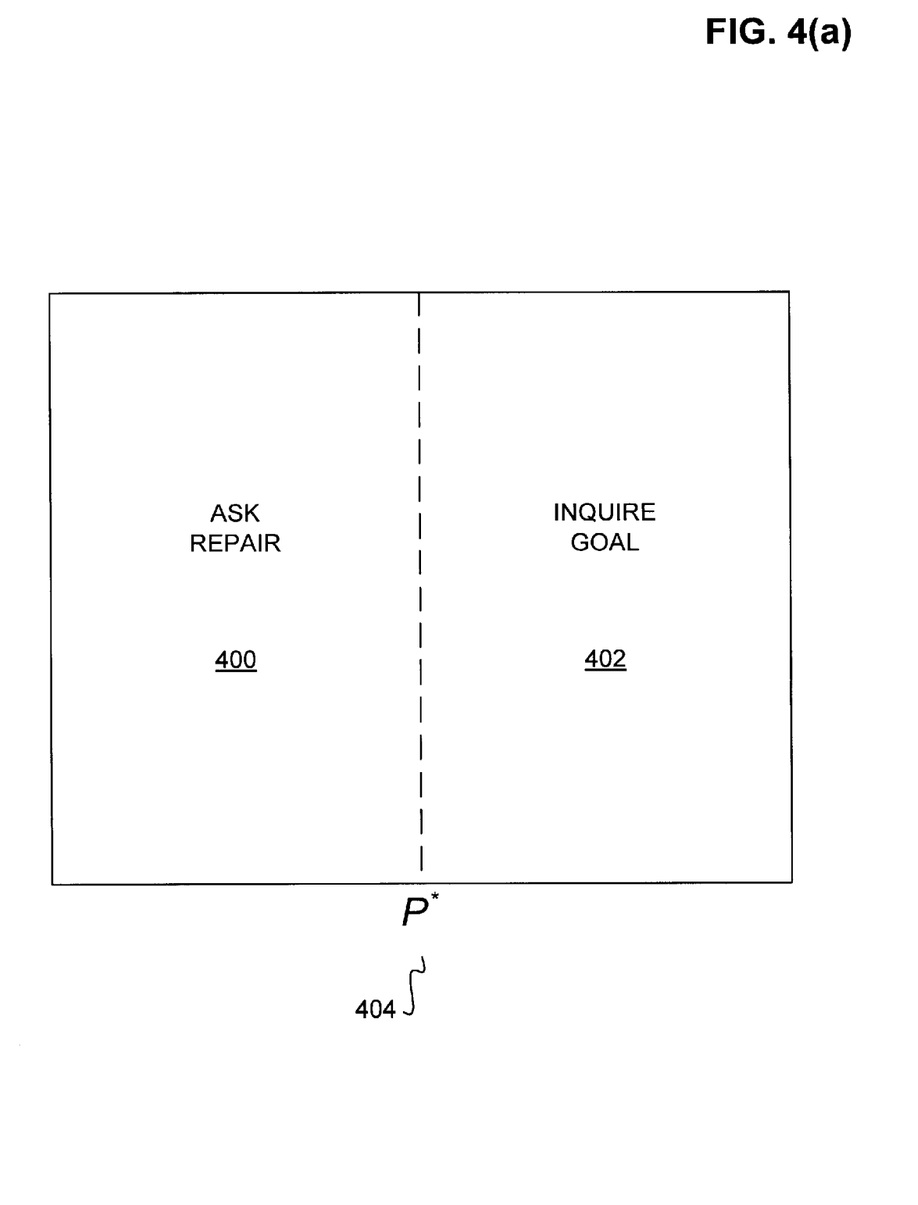
FIG. 4(a) is a diagram showing the thresholds p* utilized at the intention level, according to an embodiment of the invention.

Thresholds determine which transitional input is selected, in one embodiment. Referring now to FIG. 4(a), if p(Goal|E) does not exceed a predetermined threshold p* 404, then the probability falls within the Ask Repair region 400, such that the Inquire Goal region 402 is ruled out. Furthermore, such failures to reach mutual understanding at the intention level can sometimes be the result of lower level problems, the system also considers uncertainty at the maintenance level in its decision making. In one embodiment, in the maintenance module, a Bayesian network is used to obtain a probability distribution over three states: Channel and Signal, Channel and No Signal, and No Channel.

Figure 4B:
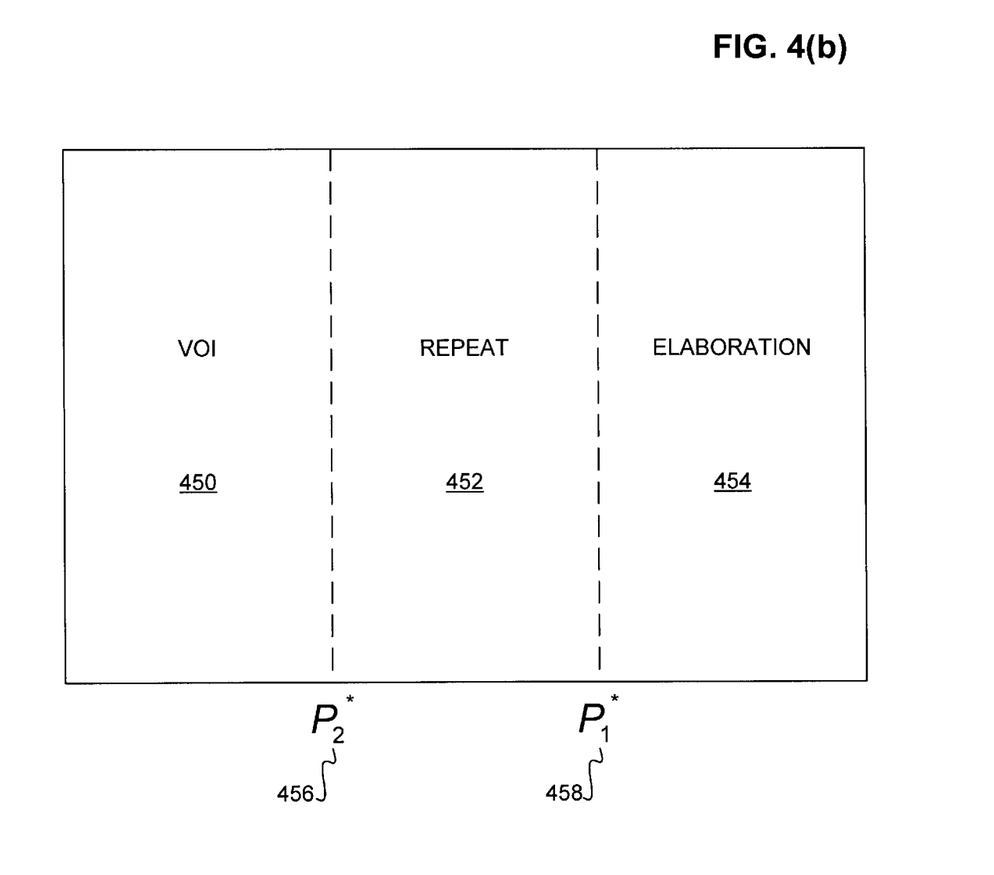
FIG. 4(b) is a diagram showing the thresholds p1* and p2* utilized at the maintenance level, according to an embodiment of the invention; and, FIG. 5 is a flowchart of a method according to an embodiment of the invention.

If in the Ask Repair region 400, thresholds are again used to determine which instantiation of Ask Repair to use. Referring now to FIG. 4(b), if p(Channel and Signal|E) exceeds a threshold p1* 458, then the probability lies in the elaboration region 454, and the system asks for an elaboration, which generally suggests an intention level misunderstanding but does not rule out a maintenance level cause, such as misparsing. If p(Channel and Signal|E) is less than the threshold p1* 458, but greater than the threshold p2* 456, then the probability lies in the repeat region 452, and the instantiation of Ask Repair, asking for a repeat, is used. This means that the most likely maintenance level state is Channel and No Signal. In such a case, the system will explicitly point out that it may be having a signal level problem while asking for a repeat. This acknowledges that resolving a misunderstanding is a collective process, since the user is now in a better position to assist in clearing up the problem.

The principle underlying this cooperative behavior in dialog has been referred to in the prior art as the "Principle of Least Collaborative Effort." For example, if a user asks a receptionist system to hail a shuttle, but the speech recognition system only picks up a few words, the system may echo one of the words in a query frame such as "I'm sorry, [shuttle]? Can you repeat that?" where [shuttle] is a slot for the word. This query thus instructs the user that the speech recognition picked out some words, but perhaps not enough to understand the utterance at the intention level.

Finally, if p(Channel and Signal|E) is less than the threshold p2* 456, then the probability lies in the value-of-information region 450. This means that the last type of Ask Repair instantiation is used, to utilize a value of information (VOI) analysis to identify the best signals to observe in light of the inferred probabilities of different goals. In one embodiment, VOI is computed by calculating for every signal the expected utility of the best decision associated with each value that the signal may take on. The analysis sums the expected utility for each value, weighted by the probabilities of observing different values, should an observation be made. Once a signal to observed is recommended, a query frame for that signal is used. For example, if the VOI analysis recommends observing the word "shuttle," the system may ask the user if the request has anything to do with getting a shuttle. This may be inappropriate at times, however, so context-dependent costs are assigned to VOI recommendations, as will be described.

It is noted that VOI computation in general is known within the art. For example, the reference Horvitz, E., Breese, J., and Henrion, M., Decision Theory in Expert Systems and Artificial Intelligence, International Journal of Approximate Reasoning, Special Issue on Uncertainty in Artificial Intelligence, 2:247–30 (1989), provides background and details on computation of VOI. Furthermore, the copending, coassigned, and cofiled application entitled "Computer-User Interaction via Task Abstraction Hierarchy", which has been incorporated by reference, also provides description regarding VOI.

In another embodiment, the transitional inputs are selected based on decision-theoretic functions, for example, that try to minimize collaborative effort, as those of ordinary skill within the art can appreciate. Such decision-theoretic functions can be used in lieu of or in addition to selecting transitional inputs based on an inference probability exceeding a threshold, as has been described. However, the invention is not so limited.

Referring back to the diagram of a DTN of FIG. 3, the transitional input Ask Repair brings the DTN to state 2, as represented by node 304, where, upon admitting the conditionally relevant second pair part, Repair Admitted, the DTN moves back to state 1, as represented by the node 300. In state 1, the system performs inference again with additional information acquired from the side sequence. This process of continual refinement through grounding in adjacency pairs is thus effective to clear up misunderstanding.

Referring back now to the diagram of the system 200 of FIG. 2, the conversational control subsystem 202 facilitates the sharing of evidence between the modules 204 and 206, as has been alluded to. Consistent with the notion of downward evidence, therefore, once a transitional input is selected in the intention module DTN, evidence is sent downwards to fix transitional inputs in a maintenance module DTN, as represented by the arrow 220. For example, when the user provides Repair Admitted to Ask Repair, that fixes a transitional input in the maintenance module DTN specifying that the question asked was attended to by the user. If the dialog should continue and inference has to be performed on a maintenance level Bayesian network, in one embodiment, then a node indicating that the user was attentive to the previous utterance gets instantiated.

As has been described, transitional inputs in a DTN are set by decision-theoretic functions. In some embodiments, that involves only probability thresholds, as has been described in conjunction with FIGS. 4(a) and 4(b). However, the invention is not so limited. In other embodiments, the costs and benefits, as expressed in utilities, of taking a particular action can be evaluated. In one embodiment, since the conversation control subsystem 202 keeps track of higher level events, the DTN's in both modules submit utilities for proper alignment with dialog context and social factors. For example, in the intention module 204, the conversation control subsystem 202 can magnify the cost of asking a question as the number of questions asked within the same adjacency pair increases. Thus, while the cost of asking one question may be slight, it rapidly increases (perhaps even exponentially) with the number of questions asked about the same request.

In one embodiment, the conversation control subsystem 202 is also responsible for discerning when the joint activity has been terminated. In one embodiment, it does this by using its own Bayesian network with a distribution over conversation level states such as Advancing Activity, Unexpected Termination, etc. The invention is not so limited, however.

Decision-Making in a Generalized Manner

In this section of the detailed description, a more generalized decision-analytic approach to decision making is described. That is, in the previous section decision-making was described in relation to the determination of inference probabilities, and taking action (making decisions) based on those inference probabilities exceeding or not exceeding certain thresholds. However, as can be appreciated by those of ordinary skill within the art, this is one specific decision-analytic manner of what can be referred to as the computation of ideal action under uncertainty, given the consideration of the utilities associated with each outcome. That is, the description provided in the previous section is a specific embodiment of the more generalized approach that is now described.

In the generalized approach, a probability distribution over the leading variable of interest, known within the art as the hypothesis variable, such as a probability distribution over user goals, is first determined, for example, by use of a Bayesian network as known within the art. Next, the action of maximum expected value associated with the probability distribution is determined. The value for immediate action of the optimal action A * is its expected utility, which can be written as:

$$eu(A^*)=\max_A \Sigma_j u(A_i,H_j)p(H_j|E)$$

where $\max_A$ indicates the selecting of an action A to a maximize the summation, $u(A_i,H_j)$ is the utility of the particular action $A_i$ when the user has the goal (hypothesis) $H_j$ and $p(H_j|E)$ is the probability of user goal (hypothesis) $H_j$ given the current set of observed and background evidence E. We use A* to refer to the action A with the maximum expected utility, obtained by taking the arg $\max_a{}^u$ of the above equation.

The actions to be considered by the generalized approach are the same as the more specific approach described in the previous section. The action of the maximum expected value associated within the probability distribution is then followed.

Method

In this section of the detailed description, a method according to an embodiment of the invention is described. The method is desirably computer-implemented, and is described with reference to FIG. 5. The computer-implemented method is desirably realized at least in part as one or more programs running on a computer—that is, as a program executed from a computer-readable medium such as a memory by a processor of a computer. The program is desirably storable on a machine-readable medium such as a floppy disk or a CD-ROM, for distribution and installation and execution on another computer. The invention is not so limited, however.

Figure 5:
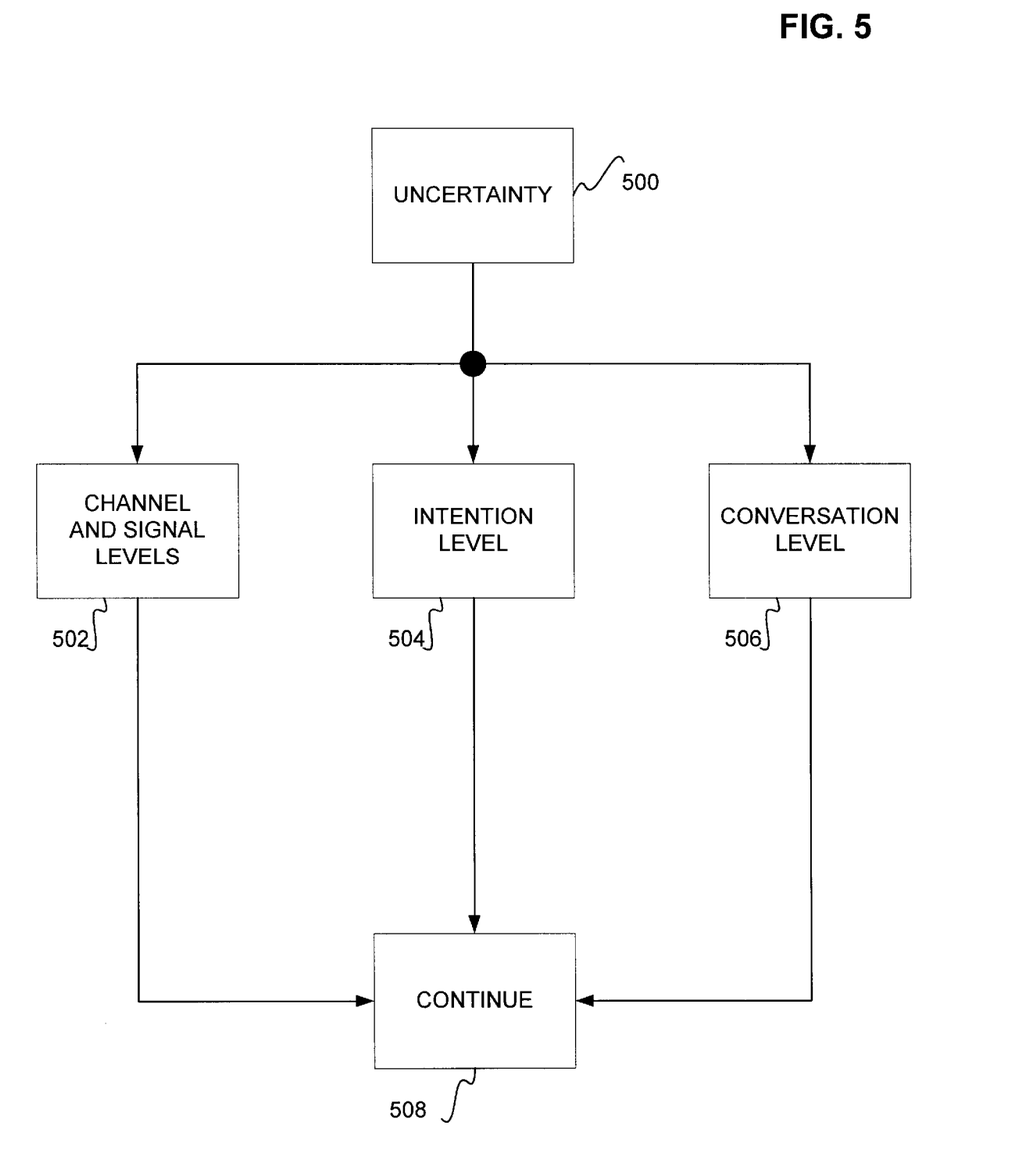

Referring now to FIG. 5, a flowchart of a method according to an embodiment is shown. The method shows a generalized approach to resolving uncertainty that can be undertaken in one embodiment of the invention. Thus, in the event of uncertainty 500, the uncertainty is resolved at the level at which it lies: at the channel or signal levels 502, at the intention level 504, or at the conversation level 506. This is in contrast to the prior art, which does not resolve uncertainty in different manners depending on the level at which the uncertainty is experienced. In one embodiment of the invention, the uncertainty is managed and resolved as has been already described in the application. For example, in the case of management of uncertainty at the channel and signal levels 502 or at the intention level 504, DTN's can be utilized, as has been described. Once the uncertainty has been managed effectively (that is, resolved), then the method can continue at 508.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized system for repairing communication failure within a computer-user interaction context comprising:

a maintenance module to manage uncertainty regarding signal identification and channel fidelity;

an intention module, supported by the maintenance module, to manage uncertainty regarding user goal recognition from signals; and, a conversation control subsystem surrounding the maintenance module and the intention module, to manage a joint activity and at least one high-level event regarding the joint activity.

2. The system of claim 1, wherein the maintenance module is to manage uncertainty of at least one of a channel level and a signal level.

3. The system of claim 1, wherein the intention module is to manage uncertainty at an intention level.

4. The system of claim 1, wherein the conversational control subsystem is to manage uncertainty at a conversation level.

5. The system of claim 1, wherein at least one of the conversation control subsystem, the intention module, and the maintenance module comprises a computer program executed by a processor from a computer-readable medium.

6. The system of claim 1, wherein at least one of the intention module and the maintenance module comprises a decision-based transition network comprising a plurality of nodes.

7. The system of claim 6, wherein at least the intention module comprises a decision-based transition network comprising a plurality of nodes, and the plurality of nodes of the network of the intention module comprise:

a request node;

an uptake node based on the request node; and, a side-sequence repair node based on the request node.

8. The system of claim 6, wherein the plurality of nodes comprise a plurality of transitional inputs.

9. The system of claim 8, wherein the plurality of transitional inputs comprise a selected transitional input.

10. The system of claim 9, wherein the selected transitional input comprises a selected transitional input based on an inference probability exceeding a threshold.

11. The system of claim 9, wherein the selected transitional input comprises a selected transitional input based on decision theoretic functions.

12. The system of claim 11, wherein the decision-theoretic functions attempt to minimize collaborative effort.

13. The system of claim 10, wherein the inference probability is determined by determining a probability distribution over leading variables of interest.

14. The system of claim 10, wherein the inference probability comprises an inference probability determined via a Bayesian network.

15. The system of claim 6, wherein at least one of the plurality of nodes comprises an instantiation of one of a group of possible nodes.

16. The system of claim 15, wherein the instantiation comprises a selected instantiation based on an inference probability exceeding a threshold.

17. The system of claim 16, wherein the inference probability comprises an inference probability determined via a Bayesian network.

18. The system of claim 15, wherein the instantiation comprises an instantiation for a dialog about one of: an elaboration, and a repetition.

19. The system of claim 15, wherein the instantiation comprises an instantiation utilizing a value-of-information analysis.

20. The system of claim 19, wherein the value-of-information analysis comprises a value-of-information analysis based on utilities and costs affected by the at least one high-level event managed by the conversation control subsystem.

21. The system of claim 8, wherein each of the intention module and the maintenance module comprises a decision-based transition network comprising a plurality of nodes comprising a plurality of transitional inputs, and wherein the conversational control subsystem, based on a transitional input selected in the intention module, is to send evidence to the maintenance module to cause a transitional input to be fixed in the maintenance module.

22. The system of claim 1, wherein the conversation control subsystem is further to discern termination of the joint activity.

23. The system of claim 1, wherein the at least one high-level event comprises a number of questions asked.

24. A computerized system for repairing communication failure within a computer-user interaction context comprising:
  a maintenance module having a first decision-based transition network comprising a first plurality of nodes having a first plurality of transitional inputs;
  an intention module, supported by the maintenance module, having a second decision-based transition network comprising a second plurality of nodes having a second plurality of transitional inputs; and,
  a conversational control subsystem surrounding the maintenance module and the intention module.

25. The system of claim 24, wherein the conversational control subsystem is to manage a joint activity, at least one high-level event regarding the joint activity, and termination of the joint activity.

26. The system of claim 24, wherein at least one of the first and the second plurality of transitional inputs comprise a selected transitional input.

27. The system of claim 26, wherein the selected transitional input comprises a selected transitional input based on an inference probability exceeding a threshold, the inference probability determined via a Bayesian network.

28. The system of claim 24, wherein at least one of the first plurality of nodes and the second plurality of nodes comprises an instantiation of one of a group of possible nodes.

29. The system of claim 28, wherein the instantiation comprises a selected instantiation based on an inference probability exceeding a threshold, the inference probability determined via a Bayesian network.

30. The system of claim 28, wherein the instantiation comprises a selected instantiation utilizing a value-of-information analysis.

31. The system of claim 30, wherein the value-of-information analysis comprises a value-of-information analysis based on utilities and costs affected by at least one high-level event managed by the conversation control system.

32. The system of claim 24, wherein the conversational control subsystem, based on a transitional input selected in the intention module, is to send evidence to the maintenance module to cause a transitional input to be fixed in the maintenance module.

33. A computer-implemented method for repairing communication failure within a computer-user interaction context comprising:
  managing uncertainty at a channel level and a signal level;
  managing uncertainty at an intention level; and,
  managing uncertainty at a conversation level.

34. The method of claim 33, wherein managing uncertainty at a channel level and a signal level comprises utilizing a first decision-based transition network having a first plurality of nodes having a first plurality of transitional inputs, and managing uncertainty at an intention level comprises utilizing a second decision-based transition network having a second plurality of nodes having a second plurality of transitional inputs.

35. The method of claim 33, wherein managing uncertainty at a conversation level comprises managing a joint activity, at least one high-level event regarding the joint activity, and termination of the joint activity.

36. The method of claim 34, wherein at least one of utilizing a first decision-based transition network and utilizing a second decision-based transition network comprises selecting a selected transitional input.

37. The method of claim 36, wherein selecting a selected transitional input comprises:
  determining an inference probability via a Bayesian network; and,
  selecting the selected transitional input based on the inference probability exceeding a threshold.

38. The method of claim 34, wherein at least one of utilizing a first decision-based transition network and utilizing a second decision-based transition network comprises instantiating an instantiation node.

39. The method of claim 38, wherein instantiating an instantiation node comprises:
  determining an inference probability via a Bayesian network; and,
  instantiating the instantiation node based on the inference probability exceeding a threshold.

40. The method of claim 38, wherein the at least one of utilizing a first decision-based transition network and utilizing a second decision-based transition network further comprises utilizing a value-of-information analysis within the instantiation node.

41. The method of claim 40, wherein utilizing a value-of-information analysis comprises assessing costs and utilities affected by at least one managed high-level event managed.

42. The method of claim 34, further comprising:
  selecting a second transitional input; and,
  fixing a first transitional input based on the second transitional input.

43. A machine-readable medium having instructions stored thereon for execution by a processor to cause performance of a method for repairing communication failure within a computer-user interaction context comprising:
  utilizing a first decision-based transition network having a first plurality of nodes having a first plurality of transitional inputs to manage uncertainty at a channel level and a signal level;
  utilizing a second decision-based transition network having a second plurality of nodes having a second plurality of transitional inputs to manage uncertainty at an intention level; and,
  managing uncertainty at a conversation level.

44. The medium of claim 43, wherein managing uncertainty at a conversation level comprises managing a joint activity, at least one high-level event regarding the joint activity, and termination of the joint activity.

45. The medium of claim 43, wherein at least one of utilizing a first decision-based transition network and utilizing a second decision-based transition network comprises selecting a selected transitional input.

46. The medium of claim 45, wherein selecting a selected transitional input comprises:
  determining an inference probability via a Bayesian network; and, selecting the selected transitional input based on the inference probability exceeding a threshold.

47. The medium of claim 43, wherein at least one of utilizing a first decision-based transition network and utilizing a second decision-based transition network comprises instantiating an instantiation node.

48. The medium of claim 47, wherein instantiating an instantiation node comprises:

determining an inference probability via a Bayesian network; and, instantiating the instantiation node based on the inference probability exceeding a threshold.

49. The medium of claim 48, wherein the at least one of utilizing a first decision-based transition network and utilizing a second decision-based transition network further comprises utilizing a value-of-information analysis within the instantiation node.

50. The medium of claim 49, wherein utilizing a value-of-information analysis comprises assessing costs and utilities affected by at least one managed high-level event managed.

51. The medium of claim 43, further comprising:

selecting a second transitional input; and, fixing a first transitional input based on the second transitional input.

* * * * *